United States Patent
Ji et al.

(10) Patent No.: US 11,727,796 B2
(45) Date of Patent: Aug. 15, 2023

(54) SYSTEM AND METHOD FOR DETERMINING VEHICLE SPEED

(71) Applicant: YUNEX GMBH, Munich (DE)

(72) Inventors: Yu Kai Ji, Shanghai (CN); Wan Li Ma, Beijing (CN)

(73) Assignee: Yunex GMBH, Munich (DE)

(*) Notice: Subject to any disclaimer, the term of this patent is extended or adjusted under 35 U.S.C. 154(b) by 284 days.

(21) Appl. No.: 16/957,807

(22) PCT Filed: Dec. 28, 2017

(86) PCT No.: PCT/CN2017/119462
§ 371 (c)(1),
(2) Date: Jun. 25, 2020

(87) PCT Pub. No.: WO2019/127232
PCT Pub. Date: Jul. 4, 2019

(65) Prior Publication Data
US 2021/0065542 A1 Mar. 4, 2021

(51) Int. Cl.
*G08G 1/052* (2006.01)
*G06N 3/08* (2023.01)
(Continued)

(52) U.S. Cl.
CPC .............. *G08G 1/052* (2013.01); *G06N 3/08* (2013.01); *G08G 1/0108* (2013.01);
(Continued)

(58) Field of Classification Search
None
See application file for complete search history.

(56) References Cited

U.S. PATENT DOCUMENTS

| 8,825,350 B1 | 9/2014 | Robinson |
| 2008/0004789 A1* | 1/2008 | Horvitz ............... G08G 1/0104 340/936 |

(Continued)

FOREIGN PATENT DOCUMENTS

| CN | 107134156 A * | 9/2017 | ........... G08G 1/0145 |
| WO | WO 2013109472 A1 | 7/2013 | |

OTHER PUBLICATIONS

Extended European Search Report dated Jun. 11, 2021.

*Primary Examiner* — Rebecca E Song
(74) *Attorney, Agent, or Firm* — Harness, Dickey & Pierce, P.L.C.

(57) ABSTRACT

A system and method are for determining a vehicle speed. In an embodiment, the system includes a first collecting module, adapted to collect traffic information; and a deep learning module, including a control model and a neural network. The control model is generated after the neural network autonomously deeply learns based on inputted traffic information. The control model is adapted to receive current traffic information including a speed and a location of a vehicle, traffic light status at a junction ahead, and traffic condition information in a road segment ahead currently collected by the first collecting module; to compute a recommended vehicle speed for the vehicle based on the current traffic information; and to output the recommended vehicle speed. Such a system may reduce the stopping times at the intersection.

10 Claims, 2 Drawing Sheets

(51) Int. Cl.
*G08G 1/01* (2006.01)
*G08G 1/0967* (2006.01)

(52) U.S. Cl.
CPC ......... *G08G 1/0133* (2013.01); *G08G 1/0145* (2013.01); *G08G 1/096716* (2013.01)

(56) References Cited

U.S. PATENT DOCUMENTS

| | | |
|---|---|---|
| 2008/0094250 A1 | 4/2008 | Myr |
| 2012/0139754 A1 | 6/2012 | Ginsberg |
| 2014/0195068 A1 | 7/2014 | Boss et al. |
| 2017/0301237 A1* | 10/2017 | MacNeille .......... H04W 68/005 |
| 2017/0372605 A1* | 12/2017 | Khandelwal ..... G08G 1/096783 |

* cited by examiner

SYSTEM AND METHOD FOR DETERMINING VEHICLE SPEED

PRIORITY STATEMENT

This application is the national phase under 35 U.S.C. § 371 of PCT International Application No. PCT/CN2017/119462 which has an International filing date of Dec. 28, 2017, which designated the United States of America, the entire contents of which are hereby incorporated herein by reference.

FIELD

Embodiments of the present application generally relate to traffic control technologies. More particularly, embodiments of the present application relates to a system and method for determining vehicle speed.

BACKGROUND

With the rapid increase of vehicles, congestions problem in intersection became very serious. In fact, an approaching vehicle with an optimal approaching speed may avoid abrupt stopping at the intersection. However, because a driver cannot predict the status of traffic lights at the junction ahead, it is difficult for the driver to determine the optimal approaching speed for crossing the intersection, and the driver can only blindly adopt an approaching speed. Thus, the stopping times at the intersection will increase, which will result in the increase of oil consumption and toxic emission, and then the environmental pollution is intensified.

SUMMARY

The inventors have recognized that there is a need for providing a good way for vehicle speed predicting. According to embodiments of the present disclosure, a system and method for determining a vehicle speed is provided to reduce the stopping times at the intersection.

At least one embodiment of the present application is directed to a system for determining a vehicle speed, comprising:

a first collecting module, adapted to collect traffic information; the traffic information comprises: a speed and a location of each vehicle, traffic light status of each intersection, and traffic condition information in each road segment; the traffic condition information in a road segment comprises: traffic flow in the road segment, and whether there is a congestion in the road segment or not; and a deep learning module, comprising a control model and a neural network capable of simulating the human brain to analyze and learn, the control model is generated after the neural network autonomously deeply learns based on inputted traffic information collected by the first collecting module; the control model is adapted to receive current traffic information comprising a speed and a location of a vehicle, traffic light status at a junction ahead, and traffic condition information in a road segment ahead currently collected by the first collecting module, compute a recommended vehicle speed for the vehicle based on the current traffic information, and output the recommended vehicle speed.

At least one embodiment of the present application is directed to a method for determining a vehicle speed, comprising:

collecting, by a first collecting module, current traffic information comprising a speed and a location of a vehicle, traffic light status at the junction ahead, and traffic condition information in a road segment ahead;

receiving, by a deep learning module, the current traffic information; wherein the deep learning module comprises a control model and a neural network capable of simulating the human brain to analyze and learn, the control model is generated after the neural network autonomously deeply learns based on received history traffic information collected by the first collecting module; the history traffic information comprises: a speed and a location of each vehicle, traffic light status of each intersection, and traffic condition information in each road segment; the traffic condition information in a road segment comprises: traffic flow in the road segment, and whether there is a congestion in the road segment or not;

computing, by the deep learning module, a recommended vehicle speed for the vehicle based on the current traffic information, and outputting recommended the vehicle speed.

It can be seen from the foregoing technical solutions that, in the implementation manners of the present disclosure, a deep learning module comprising a neural network capable of simulating the human brain to analyze and learn, may autonomously deeply learn based on inputted traffic information comprising a speed and a location of each vehicle, traffic light status of each intersection, and traffic condition information in each road segment, and then generate a control model, the control model may, according to current traffic information comprising a speed and a location of a vehicle, traffic light status at a junction ahead, and traffic condition information in a road segment ahead, compute a recommended vehicle speed for the vehicle, and the recommended vehicle speed is an optimal approaching speed for the vehicle to avoid a stop at the intersection. Thus the stopping times may be reduced.

| List of reference numbers: | |
|---|---|
| reference numbers | meanings |
| 110 | first collecting module |
| 120 | second collecting module |
| 130 | deep learning module |
| 131 | neural network |
| 132 | control model |
| 140 | feedback receiving module |
| 151 | smart phone |
| 152 | roadside unit |
| 153 | map provider |
| 154 | ECB |
| 201~203 | steps |
| 310 | memory |
| 320 | processor |

DETAILED DESCRIPTION OF THE EXAMPLE EMBODIMENTS

The present disclosure will be described in further detail hereinafter with reference to accompanying drawings and examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
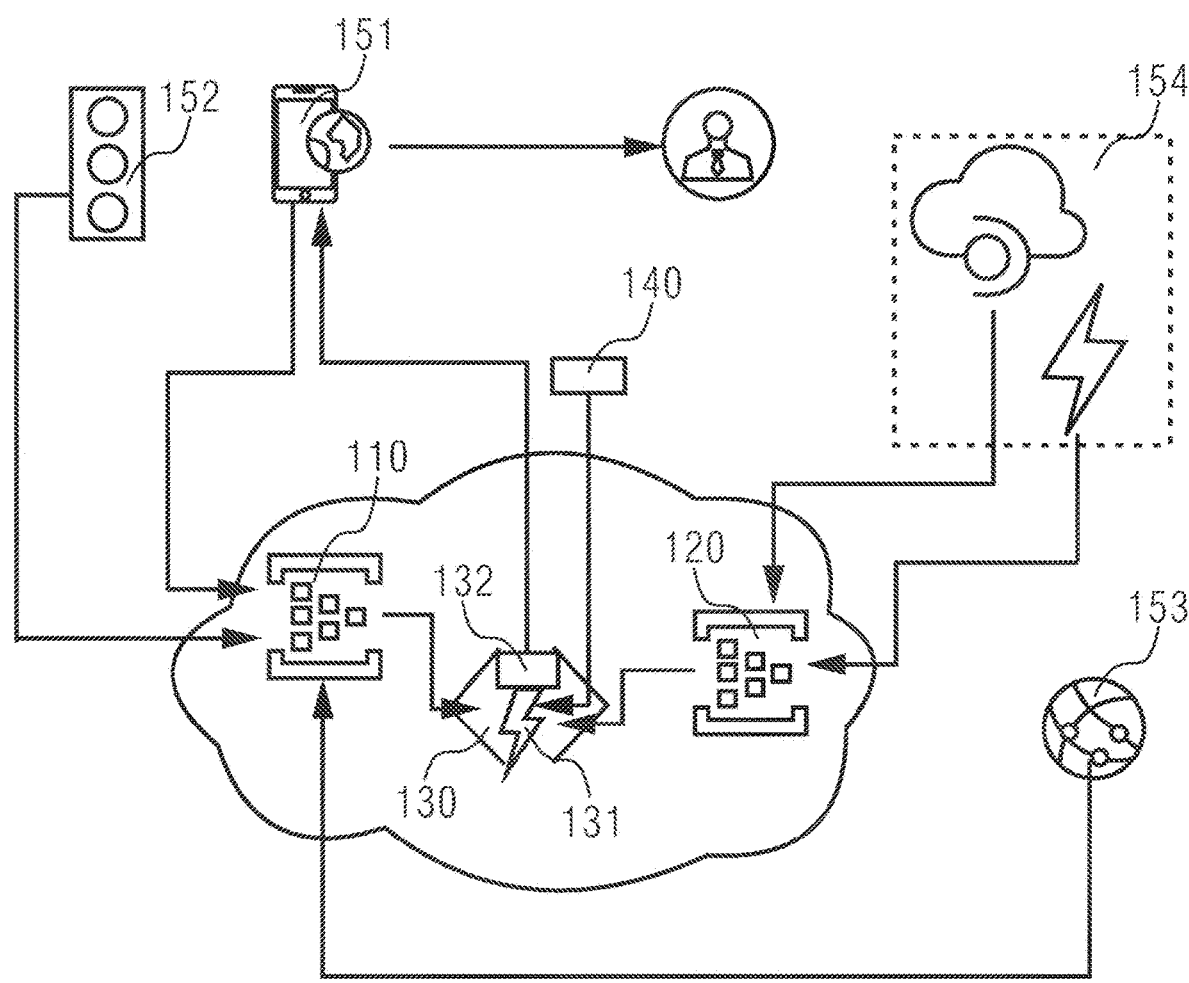
FIG. 1 is a schematic diagram illustrating a system for determining a vehicle speed according to an embodiment of the present disclosure.

FIG. 1 is a schematic diagram illustrating a system for determining a vehicle speed according to an embodiment of the present disclosure. As shown in FIG. 1, the system includes a first collecting module 110, a second collecting module 120, and a deep learning module 130.

The first collecting module 110 is adapted to real-time collect traffic information; the traffic information may include: a speed and a location of each vehicle, traffic light status of each intersection, and traffic condition information in each road segment; the traffic condition information in a road segment comprises: traffic flow in the road segment, and whether there is a congestion in the road segment or not. Regarding to a vehicle, current traffic information may include a speed and a location of the vehicle, traffic light status at a junction ahead, and traffic condition information in a road segment ahead.

As shown in FIG. 1, in one example, the first collecting module 110 may collect the speed and the location of a vehicle from a smart phone 151 of a driver of the vehicle or from a traffic console (not shown in FIG. 1) of the vehicle. The first collecting module 110 may collect the traffic light status of an intersection from a roadside unit (RSU) 152 of the intersection. The first collecting module 110 may collect the traffic condition information in a road segment from a map provider 153.

The second collecting module 120 is adapted to real-time collect environment condition information; the environment condition information may include: air quality status, temperature and/or precipitation of each district. Regarding to a vehicle, current environment condition information may include air quality status, temperature and/or precipitation of vicinity of the vehicle.

In an example, the second collecting module 120 may collect the air quality status from Siemens CT China, CCS project, there is an intelligent device called ECB (embedded city box) 154 which targets to install on the road side with embedded sensors in it. The sensors include air quality sensor like pm2.5, pm10, vehicle consumption sensor like $NO_2$, $SO_2$, environmental sensor like temperature sensor, noise sensor and so on. The second collecting module 120 may also collect the information including temperature and/or precipitation of each district from the ECB 154.

The deep learning module 130 includes a control model 131 and a neural network 132 capable of simulating the human brain to analyze and learn, the control model 132 is generated after the neural network 131 autonomously deeply learns based on inputted traffic information collected by the first collecting module 110 and inputted environment condition information collected by the second collecting module 120. The control model 132 is adapted to receive current traffic information comprising a speed and a location of a vehicle, traffic light status at the junction ahead, and traffic condition information in a road segment ahead currently collected by the first collecting module 110 and current environment condition information comprising air quality status, temperature and/or precipitation of vicinity of the vehicle currently collected by the second collecting module 120, compute a recommended vehicle speed for the vehicle based on the current traffic information and the current environment condition information, and output the recommended vehicle speed.

In an example, the deep learning module 130 may send the recommended vehicle speed to the smart phone of the driver of the vehicle or to the traffic console of the vehicle, so that the driver or the traffic console may drive the vehicle at the recommended vehicle speed.

In an example, the control model 132 may be generated after the neural network autonomously deeply learns based on inputted traffic information collected by the first collecting unit in a predetermined time period and inputted environment condition information collected by the second collecting unit in the predetermined time period. In an example, the predetermined time period may be a latest time period less than 24 hours. For example, the predetermined time period may be a latest 20, 19, 18, 17, 16, 15, 14, 13, 12, 11, 10, 9, 8, 7, 6 or 5 minutes.

In an example, as shown in FIG. 1, the system may further include a feedback receiving module 140, adapted to receive feedback information about whether the vehicle does not need to stop at the junction ahead when going at the recommended vehicle speed outputted by the deep learning module 130, when the feedback information indicating the vehicle needs to stop at the junction ahead when going at the recommended vehicle speed, output a parameter adjustment instruction to the neural network 131, and then the neural network 131 may be further adapted to, after receiving the parameter adjustment instruction, continue to autonomously deeply learn based on newly inputted traffic information collected by the first collecting module and newly inputted environment condition information collected by the second collecting module, and generate an updated control model 132.

In an example, the feedback receiving module 140 may receive the feedback information from a monitor (not shown in FIG. 1) mounted at the junction for monitoring the vehicle whether the vehicle does not need to stop at the junction ahead when going at the recommended vehicle speed. In another example, the feedback receiving module 140 may receive the feedback information from the smart phone 151 of the driver or the traffic console of the vehicle.

In the embodiment of the present disclosure, the neural network 131 may utilize program code or a chip possessing deep learning function to achieve the autonomous deep learning function.

In another embodiment, there may be not the second collecting module 120 in the system, that is to say, the control model 132 may be generated after the neural network 131 autonomously deeply learns only based on inputted traffic information collected by the first collecting module 110; and the control model 132 may be adapted to only receive current traffic information comprising a peed and a location of a vehicle, traffic light status at the junction ahead, and traffic condition information in a road segment ahead currently collected by the first collecting module 110, and then compute a recommended vehicle speed for the vehicle based on the current traffic information, and output the recommended vehicle speed.

Figure 2:
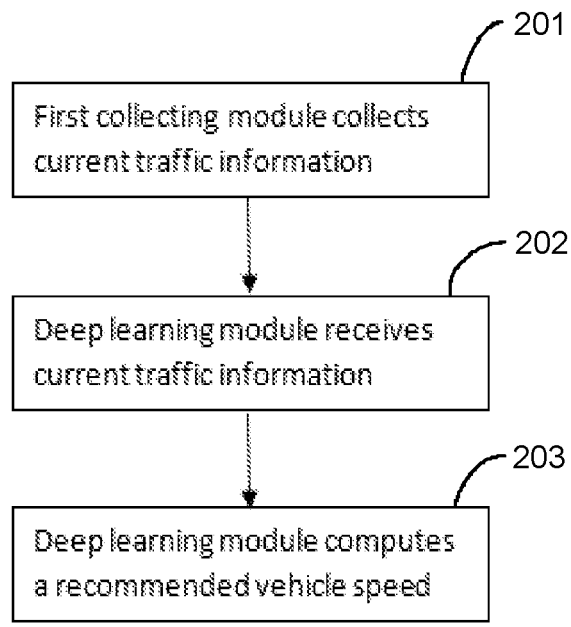
FIG. 2 is a flowchart illustrating a method for determining a vehicle speed according to an embodiment of the present disclosure.

FIG. 2 is a flowchart illustrating a method for determining a vehicle speed according to an embodiment of the present disclosure. As shown in FIG. 2, the method may include the following processes.

At block 201, a first collecting module collects current traffic information comprising a speed and a location of a vehicle, traffic light status at the junction ahead, and traffic condition information in a road segment ahead, and then the first collecting module sends the current traffic information to a deep learning module.

In one example, the first collecting module may collect the speed and the location of a vehicle from a smart phone of a driver of the vehicle or from a traffic console of the vehicle; collect the traffic light status of an intersection from a roadside unit (RSU) of the intersection; and collect the traffic condition information in a road segment from a map provider.

At block 202, the deep learning module receives the current traffic information. wherein the deep learning module comprises a control model and a neural network capable of simulating the human brain to analyze and learn, the control model is generated after the neural network autonomously deeply learns based on received history traffic information collected by the first collecting module; the history traffic information comprises: a speed and a location of each vehicle, traffic light status of each intersection, and traffic condition information in each road segment; the traffic condition information in a road segment comprises: traffic flow in the road segment, and whether there is a congestion in the road segment or not.

At block 203, the deep learning module computes a recommended vehicle speed for the vehicle based on the current traffic information, and outputs the recommended vehicle speed.

In an example, the method may further include: a second collecting module collects current environment condition information comprising air quality status, temperature and/or precipitation of vicinity of the vehicle, and sends the current environment condition information to the deep learning module.

In an example, the second collecting module 120 may collect the air quality status from Siemens CT China, CCS project, there is an intelligent device called ECB (embedded city box) which targets to install on the road side with embedded sensors in it. The sensor include air quality sensor like pm2.5, pm10, vehicle consumption sensor like NO2, SO2, environmental sensor like temperature sensor, noise sensor and so on. The second collecting module 120 may also collect information including the temperature and/or precipitation of each district from the ECB.

The deep learning module further receives the current environment condition information, and computes a recommended vehicle speed for the vehicle based on the current traffic information and the current environment condition information. Wherein the control model in the deep learning module is generated after the neural network autonomously deeply learns based on inputted history traffic information collected by the first collecting module and inputted history environment condition information collected by the second collecting module; the history environment condition information may include air quality status, temperature and/or precipitation of each district.

In an example, the control model may be generated after the neural network autonomously deeply learns based on inputted traffic information collected by the first collecting unit in a predetermined time period and inputted environment condition information collected by the second collecting unit in the predetermined time period. In an example, the predetermined time period may be a latest time period less than 24 hours. For example, the predetermined time period may be a latest 20, 19, 18, 17, 16, 15, 14, 13, 12, 11, 10, 9, 8, 7, 6 or 5 minutes.

In an example, the method may further include: a feedback receiving module receives feedback information about whether the vehicle does not need to stop at the junction ahead when going at the vehicle speed outputted by the deep learning module; when the feedback information indicating the vehicle needs to stop at the junction ahead when going at the vehicle speed, the verifying module outputs a parameter adjustment instruction to the neural network. After receiving the parameter adjustment instruction, the neural network continues to autonomously deeply learn based on newly inputted traffic information collected by the first collecting module and newly inputted environment condition information collected by the second collecting module, and then generates an updated control model.

The present disclosure provides a non-transitory computer readable storage medium having stored therein one or more instructions, which, when executed by a computing device, cause the computing device to achieve the above mentioned method for determining a vehicle speed. In particular, it may provide a system or apparatus equipped with a storage medium on which software program codes for realizing the functions of any of the above-described embodiments are stored, and a computer (or a CPU or an MPU of the system or apparatus)) reads out and executes the program code stored in the storage medium. In this case, the program code itself read from the storage medium can realize the function of any one of the above-described embodiments, and thus the program code and the storage medium storing the program code constitute a part of the present disclosure.

Figure 3:
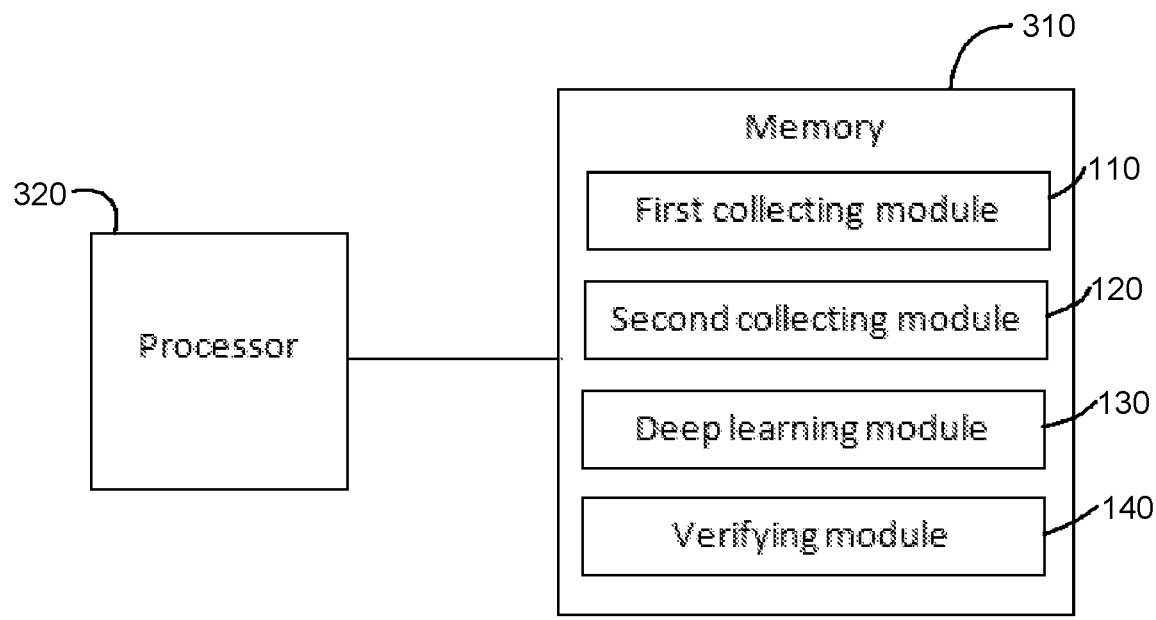
FIG. 3 is a schematic diagram illustrating a system for determining a vehicle speed according to another embodiment of the present disclosure.

For example, FIG. 3 is a schematic diagram illustrating a system for determining a vehicle speed according to another embodiment of the present disclosure. As shown in FIG. 3, the system may include a memory 310 and a processor 320 in communication with the memory 310. The memory 310 stores a group of machine-readable instructions which may be executed by the processor 320 to achieve the above mentioned method for determining a vehicle speed. Or, it may be understood that, in one example, the machine-readable instructions include a first collecting module 110, a second collecting module 120, and a deep learning module 130. In another example, the machine-readable instructions further include a verifying module 140.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure. The non-transitory storage medium includes a hard disk, a floppy disk, a magnetic disk, a compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

It can be seen from the foregoing technical solutions that, in the implementation manners of the present disclosure, a deep learning module comprising a neural network capable of simulating the human brain to analyze and learn, may autonomously deeply learn based on inputted traffic information comprising a speed and a location of each vehicle, traffic light status of each intersection, and traffic condition information in each road segment, and then generate a control model, the control model may, according to current traffic information comprising a speed and a location of a vehicle, traffic light status at a junction ahead, and traffic condition information in a road segment ahead, compute a recommended vehicle speed for the vehicle, and the recommended vehicle speed is an optimal approaching speed for the vehicle to avoid a stop at the intersection. Thus the stopping times may be reduced.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A system for determining vehicle speed, the system comprising:
   a first collecting module, configured to collect traffic information, the traffic information including a speed and a location of a respective vehicle of a plurality of vehicles, traffic light status of a respective intersection of a plurality of intersections, and traffic condition information in a respective road segment of a plurality of road segments, the traffic condition information in a respective road segment including traffic flow in the respective road segment, and whether there is congestion in the respective road segment;
   a second collecting module, configured to collect environment condition information, the environment condition information including at least one of air quality status, temperature or precipitation of each respective district of a plurality of districts;
   a deep learning module, including a control model and a neural network configured to simulate a human brain to analyze and learn, the control model being configured to be generated after the neural network autonomously deeply learns based on inputted traffic information collected by the first collecting module and inputted environment condition information collected by the second collecting module, the control model being configured to
      receive current traffic information including a current speed and a current location of the respective vehicle, traffic light status at a junction ahead of the respective vehicle, and traffic condition information in a road segment ahead of the respective vehicle and currently collected by the first collecting module,
      receive current environment condition information including at least one of air quality status, temperature or precipitation in a vicinity of the respective vehicle currently collected by the second collecting module,
      compute a recommended vehicle speed for the respective vehicle based on the current traffic information and the current environment condition information, and
      output the recommended vehicle speed; and
   a feedback receiving module configured to
      receive feedback information about whether the respective vehicle needs to stop at the junction ahead of the respective vehicle when traveling at the recommended vehicle speed, and
      output a parameter adjustment instruction to the neural network based on the feedback information indicating that the respective vehicle needs to stop at the junction ahead of the respective vehicle when traveling at the recommended vehicle speed;
   wherein the neural network is configured to
      after receiving the parameter adjustment instruction output from the feedback receiving module, continue to autonomously deeply learn based on newly inputted traffic information collected by the first collecting module and newly inputted environment condition information collected by the second collecting module, and
      generate an updated control model.

2. The system of claim 1, wherein the control model is configured to be generated after the neural network autonomously deeply learns based on inputted traffic information collected by the first collecting module in a time period and inputted environment condition information collected by the second collecting module in the time period.

3. The system of claim 2, wherein the time period is a time period of less than 24 hours.

4. The system of claim 2, wherein at least one of
   the first collecting module is configured to collect the speed and the location of the respective vehicle from a smart phone of a driver of the respective vehicle or from a traffic console of the respective vehicle;
   the first collecting module is configured to collect the traffic light status of the respective intersection from a roadside unit (RSU) of the respective intersection; or
   the first collecting module is configured to collect the traffic condition information in the respective road segment from a map provider.

5. The system of claim 1, wherein at least one of
   the first collecting module is configured to collect the speed and the location of the respective vehicle from a smart phone of a driver of the respective vehicle or from a traffic console of the respective vehicle;
   the first collecting module is configured to collect the traffic light status of the respective intersection from a roadside unit (RSU) of the respective intersection; or
   the first collecting module is configured to collect the traffic condition information in the respective road segment from a map provider.

6. The system of claim 1, wherein the neural network utilizes program code or a chip possessing deep learning function to achieve the autonomous deep learning function.

7. A method for determining a vehicle speed, the method comprising:
   collecting, by a first collecting module, current traffic information including a speed and a location of a vehicle, traffic light status at a junction ahead of the vehicle, and traffic condition information in a road segment ahead of the vehicle;

collecting, by a second collecting module, current environment condition information, the current environment condition information including at least one of air quality status, temperature or precipitation in a vicinity of the vehicle;

receiving, by a deep learning module, the current traffic information and the current environment condition information, wherein the deep learning module includes a control model and a neural network configured to simulate a human brain to analyze and learn, the control model being configured to be generated after the neural network autonomously deeply learns based on inputted history traffic information collected by the first collecting module and inputted history environment condition information collected by the second collecting module, the history traffic information including a speed and a location of each respective vehicle of a plurality of vehicles, traffic light status of each respective intersection of a plurality of intersections, and traffic condition information of each respective road segment of a plurality of road segments, the traffic condition information in each respective road segment including traffic flow in the respective road segment, and whether there is congestion in the respective road segment and the history environment condition information including at least one of air quality status, temperature or precipitation of each respective district of a plurality of districts in the vicinity of the vehicle;

computing, by the deep learning module, a recommended vehicle speed for the vehicle based on the current traffic information and the current environment condition information;

outputting the recommended vehicle speed;

receiving, by a feedback receiving module, feedback information about whether the vehicle needs to stop at the junction ahead of the respective vehicle when traveling at the recommended vehicle speed;

outputting a parameter adjustment instruction to the neural network based on the feedback information indicating that the respective vehicle needs to stop at the junction ahead of the respective vehicle when traveling at the recommended vehicle speed;

continuing, by the neural network, after receiving the parameter adjustment instruction, to autonomously deeply learn based on newly inputted traffic information collected by the first collecting module and newly inputted environment condition information collected by the second collecting module; and generating, by the neural network, an updated control module.

8. The method of claim 7, wherein
a verifying module performs the outputting the parameter adjustment instruction to the neural network.

9. A system for determining a vehicle speed, comprising:
a memory; and
a processor in communication with the memory,
the memory storing a group of machine-readable instructions, executable by the processor, to perform the method for determining a vehicle speed of claim 8 when executed by the processor.

10. A system for determining a vehicle speed, the system comprising:
a memory; and
a processor in communication with the memory,
the memory storing a group of machine-readable instructions, executable by the processor to perform the method for determining a vehicle speed of claim 7 when executed by the processor.

* * * * *